United States Patent
Liu et al.

(10) Patent No.: US 8,355,057 B2
(45) Date of Patent: Jan. 15, 2013

(54) JOINT SCALAR EMBEDDED GRAPHICS CODING FOR COLOR IMAGES

(75) Inventors: Wei Liu, San Jose, CA (US);
Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 12/873,009

(22) Filed: Aug. 31, 2010

(65) Prior Publication Data

US 2011/0085058 A1 Apr. 14, 2011

Related U.S. Application Data

(60) Provisional application No. 61/251,455, filed on Oct. 14, 2009.

(51) Int. Cl.
*H04N 5/228* (2006.01)
*G06K 9/38* (2006.01)
*G06K 9/00* (2006.01)
*G06K 9/46* (2006.01)

(52) U.S. Cl. ............... 348/222.1; 382/166; 382/162; 382/240

(58) Field of Classification Search ............... 348/231.4, 348/231.5, 222.1; 375/240.22; 382/162, 382/166
See application file for complete search history.

(56) References Cited

U.S. PATENT DOCUMENTS

| | | | |
|---|---|---|---|
| 4,319,267 A | 3/1982 | Mitsuya et al. | |
| 5,659,631 A | 8/1997 | Gormish et al. | |
| 5,805,226 A | 9/1998 | Jung | |
| 6,556,719 B1 | 4/2003 | Monro | |
| 6,778,709 B1 | 8/2004 | Taubman | |
| 2002/0118759 A1 | 8/2002 | Enficiaud et al. | |
| 2006/0233262 A1 | 10/2006 | Ridge et al. | |
| 2007/0189397 A1 | 8/2007 | Ngo et al. | |
| 2007/0202842 A1 | 8/2007 | Shao et al. | |
| 2008/0298694 A1 | 12/2008 | Kim et al. | |
| 2009/0214128 A1* | 8/2009 | Chen | 382/246 |
| 2009/0265744 A1* | 10/2009 | Singh et al. | 725/105 |

OTHER PUBLICATIONS

Wu, Guo-Zua et al., High-Performance Sub-Picture Compression Algorithm Used in High-Definition Video Discs, IEEE Transations on Magnetics, vol. 43, No. 2, Feb. 2007, pp. 776-779.
Noam Geri, "Wireless HDTV solves problems that compression cannot", EE Times-India,www.eetindia.com, pp. 1-3.
Singh, Harkirat et al., "A 60GHz Wireless Network for Enabling Uncompressed Video Communication", Department of Electrical and Computer Engineering Articles,IEE Communications Magazine, Dec. 2008,pp. 71-78, http://opensiuc.lib.siu.edu/ecc_articles/8.
A.J. Pinho, "Region-Based Near-Lossless Image Compression", Acoustics, Speech, and Signal Processing, May 2011,IEEE International Conference, vol. 3, pp. 1761-1764.

\* cited by examiner

*Primary Examiner* — Tuan Ho
*Assistant Examiner* — Shahbaz Nazrul
(74) *Attorney, Agent, or Firm* — Haverstock & Owens LLP (57) ABSTRACT

An improved scalar embedded graphics coding (EGC) for wireless HD compression is described herein. The image frame to be encoded is divided into blocks, which are further divided into color groups. These groups are encoded one bit plane at a time. The improved scalar EGC method and system uses shared grouping data among color components, but bit planes of each color are separately encoded. Further, during encoding a second-level grouping is able to occur on the splitting signaling of the groups. The system and method described herein retain the simplicity of scalar EGC and attain an efficiency comparable to vector EGC.

31 Claims, 8 Drawing Sheets

| Group 0 |

| Group 1 |

| 0 | 0 | 0 | 0 | 0 | 1 | 1 | 1 |
|---|---|---|---|---|---|---|---|
| 0 | 0 | 1 | 1 | 1 | 1 | 1 | 1 |
| 0 | 1 | 1 | 1 | 1 | 1 | 1 | 0 |
| 0 | 0 | 0 | 1 | 1 | 1 | 1 | 0 |
| 0 | 1 | 1 | 1 | 1 | 0 | 0 | 0 |
| 0 | 0 | 1 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |

JOINT SCALAR EMBEDDED GRAPHICS CODING FOR COLOR IMAGES

RELATED APPLICATION(S)

This application claims the priority under 35 U.S.C. §119(e) of U.S. Provisional Patent Application Ser. No. 61/251,455, filed Oct. 14, 2009, and entitled "NEW SCALAR EMBEDDED GRAPHICS CODING FOR COLOR IMAGES FOR WIRELESS HD 1.1," which is hereby incorporated by reference in its entirety for all purposes.

FIELD OF THE INVENTION

The present invention relates to the field of image processing. More specifically, the present invention relates to an embedded graphics coding implementation for color images.

BACKGROUND OF THE INVENTION

Most image compression schemes are designed for "natural images" such as photos taken by a digital camera. For natural images, strong correlation exists among neighboring pixels. Hence, most image compression schemes work as follows:

1. The pixels are decorrelated using prediction or transform or both, resulting in a sparse histogram of the prediction residuals or transform coefficients. The histogram has a single peak which is located around 0.
2. Quantization is applied as necessary.
3. The (quantized) prediction residuals or transform coefficients are entropy coded. The entropy coder is designed for distributions described above. If the distribution has a significantly different shape, the coding performance is able to be poor.

However, there are many "unnatural images" such as images of graphics or text which typically have a large dynamic range, strong contrast, sharp edges, strong textures and sparse histograms. These types of images are usually not handled well by conventional image compression algorithms. Inter-pixel correlation is weaker, and prediction or transform does not provide a sparse distribution as it does for natural images.

Some schemes have been proposed for unnatural images. One example is referred to as "histogram packing" where the encoder goes through the whole image, computes the histogram and does a non-linear mapping of the pixels before compressing the image. The compression requires a two-pass processing, causing increased memory cost and more computations. The bitstream is not scalable which means that the decoder needs the whole bitstream to decode the image. Partial reconstruction is not possible without re-encoding.

SUMMARY OF THE INVENTION

An improved scalar embedded graphics coding (EGC) for color pictures is described herein. In some embodiments, the improved scalar EGC is used with wireless HD compression. The image frame to be encoded is divided into blocks, which are further divided into color groups. These groups are encoded one bit plane at a time. The improved scalar EGC method and system uses shared grouping data, but bit planes of each color are separately encoded. Further, during encoding a second grouping is able to occur. The system and method described herein retain the simplicity of scalar EGC and attain an efficiency comparable to vector EGC.

In one aspect, a method of compression programmed in a controller in a device comprises partitioning an image into blocks, separating the blocks into groups, wherein the groups are based on shared data of the groups among color components and encoding the groups separately for each bit plane using splitting signaling. Splitting signaling further comprises indicating whether a group of the groups is split, if the group is split, then coding raw bits of the group and if the group is not split, then coding a refinement bit. The split comprises disparate bit values and the not split comprises same bit values. Second-level grouping is applied to the splitting signaling of the groups. The second-level grouping includes determining if any of the groups are split, if none of the groups are split, then indicating no split in the groups and coding a refinement bit for each of the groups and if at least one of the groups is split: indicating a split in at least one of the groups, indicating whether the individual group is split and if the individual group is split, then coding raw bits of the group, and if the group is not split, then coding a refinement bit. The shared data includes information about which of the groups pixels belong to. Encoding each bit plane of each group is in an arbitrary order, wherein arbitrary includes any order of color components but going from a most significant bit plane to a least significant bit plane. The image is a frame from a high definition video. The high definition video is a format selected from the group consisting of HDCAM, HDCAM-SR, DVCPRO HD, D5 HD, XDCAM HD, HDV and AVCHD. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a system for compression programmed in a controller in a device, the system comprises a partitioning module for partitioning an image into blocks, a separating module for separating the blocks into groups, wherein the groups are based on shared data among color components and an encoding module for encoding the groups separately for each bit plane using splitting signaling. Splitting signaling further comprises indicating whether a group of the groups is split, if the group is split, then coding raw bits of the group and if the group is not split, then coding a refinement bit. The split comprises disparate bit values and the not split comprises same bit values. The system further comprises a second-level module for applying second-level grouping to the splitting signaling of the groups. The second-level grouping includes determining if any of the groups are split, if none of the groups are split, then indicating no split in the groups and coding a refinement bit for each of the groups and if at least one of the groups is split: indicating a split in at least one of the groups, indicating whether the individual group is split and if the individual group is split, then coding raw bits of the group, and if the group is not split, then coding a refinement bit. The shared data includes information about which of the groups pixels belong to. Encoding each bit plane of each group is in an arbitrary order, wherein arbitrary includes any order of color components but going from a most significant bit plane to a least significant bit plane. The image is a frame from a high definition video. The high definition video is a format selected from the group consisting of HDCAM, HDCAM-SR, DVCPRO HD, D5 HD, XDCAM HD, HDV and AVCHD. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a camera device comprises a video acquisition component for acquiring a high definition video, a memory for storing an application, the application for partitioning an image of the video into blocks, separating the blocks into groups, wherein the groups are based on shared data of the groups among color components and encoding the groups separately for each bit plane using splitting signaling and a processing component coupled to the memory, the processing component configured for processing the application. Splitting signaling further comprises indicating whether a group of the groups is split, if the group is split, then coding raw bits of the group and if the group is not split, then coding a refinement bit. The split comprises disparate bit values and the not split comprises same bit values. Second-level grouping is applied to the splitting signaling of the groups. The second-level grouping includes determining if any of the groups are split, if none of the groups are split, then indicating no split in the groups and coding a refinement bit for each of the groups and if at least one of the groups is split: indicating a split in at least one of the groups, indicating whether the individual group is split and if the individual group is split, then coding raw bits of the group, and if the group is not split, then coding a refinement bit. The shared data includes information about which of the groups pixels belong to. Encoding each bit plane of each group is in an arbitrary order, wherein arbitrary includes any order of color components but going from a most significant bit plane to a least significant bit plane. The image is a frame from a high definition video. The high definition video is a format selected from the group consisting of HDCAM, HDCAM-SR, DVCPRO HD, D5 HD, XDCAM HD, HDV and AVCHD.

DETAILED DESCRIPTION OF THE PREFERRED EMBODIMENT

An improved scalar Embedded Graphics Coding (EGC) is less complex and provides similar performance to vector EGC. Vector EGC requires encoding of RGB or YUV components of a block together. Thus, more complexity is needed.

Figure 1:
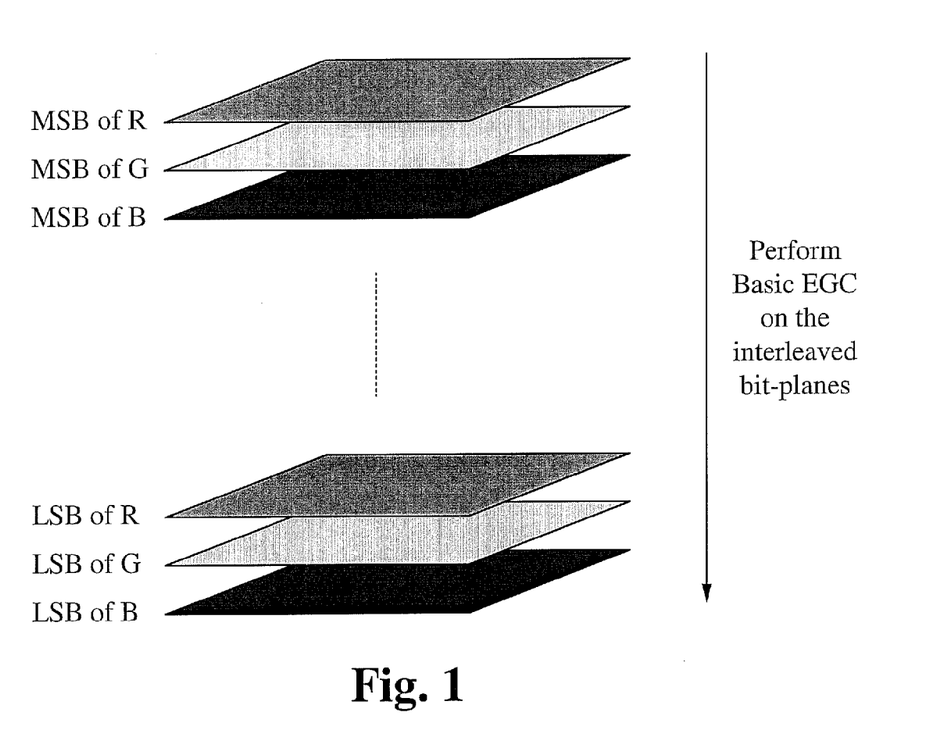
FIG. 1 illustrates a diagram of interleaving bit-planes of different colors according to some embodiments.

FIG. 1 illustrates a diagram of interleaving colors according to some embodiments. The bit-planes of RGB are interleaved to generate a virtual block with 24 bit planes. Scalar EGC is able to be applied directly to the virtual block or two-level signaling of splitting is able to be implemented.

Figure 2A:
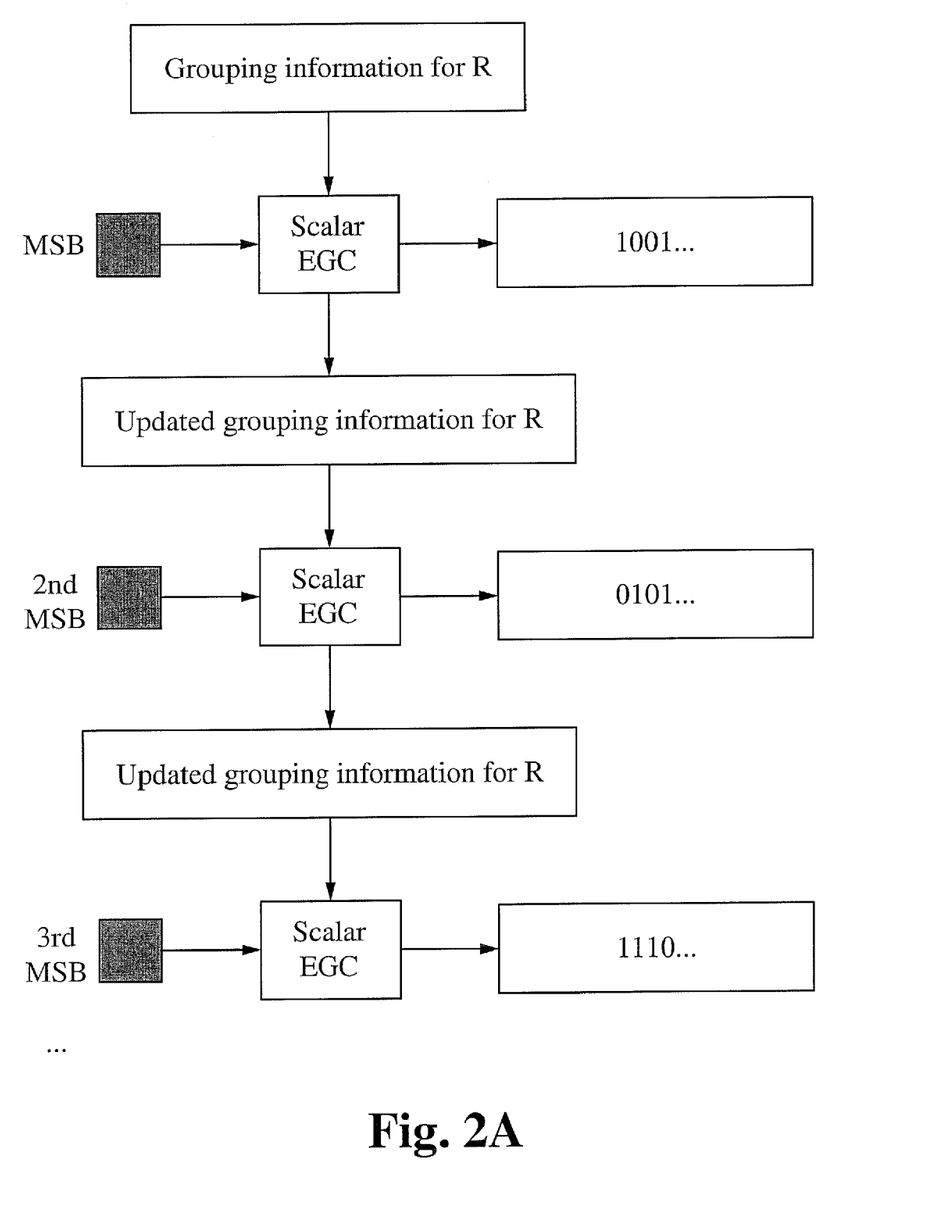
FIG. 2A illustrates a diagram of scalar EGC.
Figure 2B:
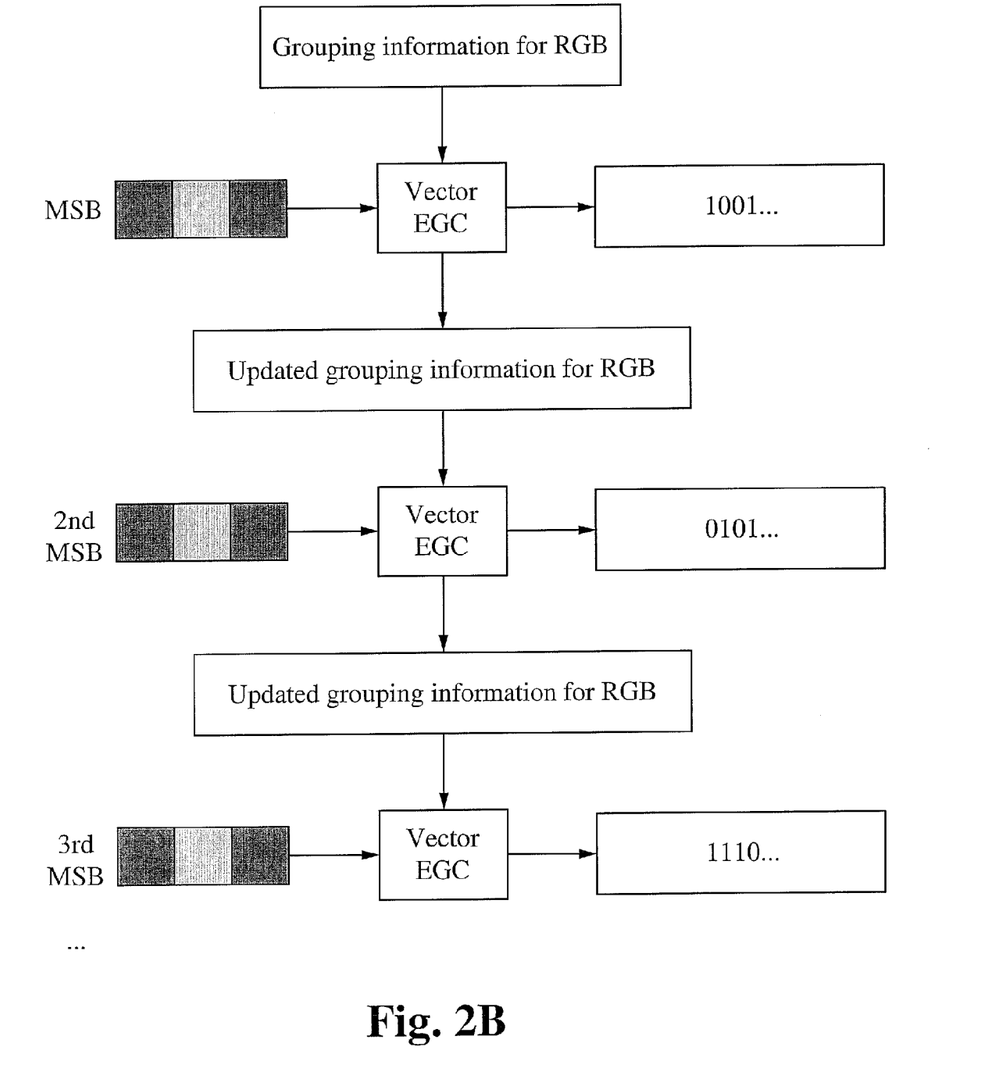
FIG. 2B illustrates a diagram of vector EGC.
Figure 2C:
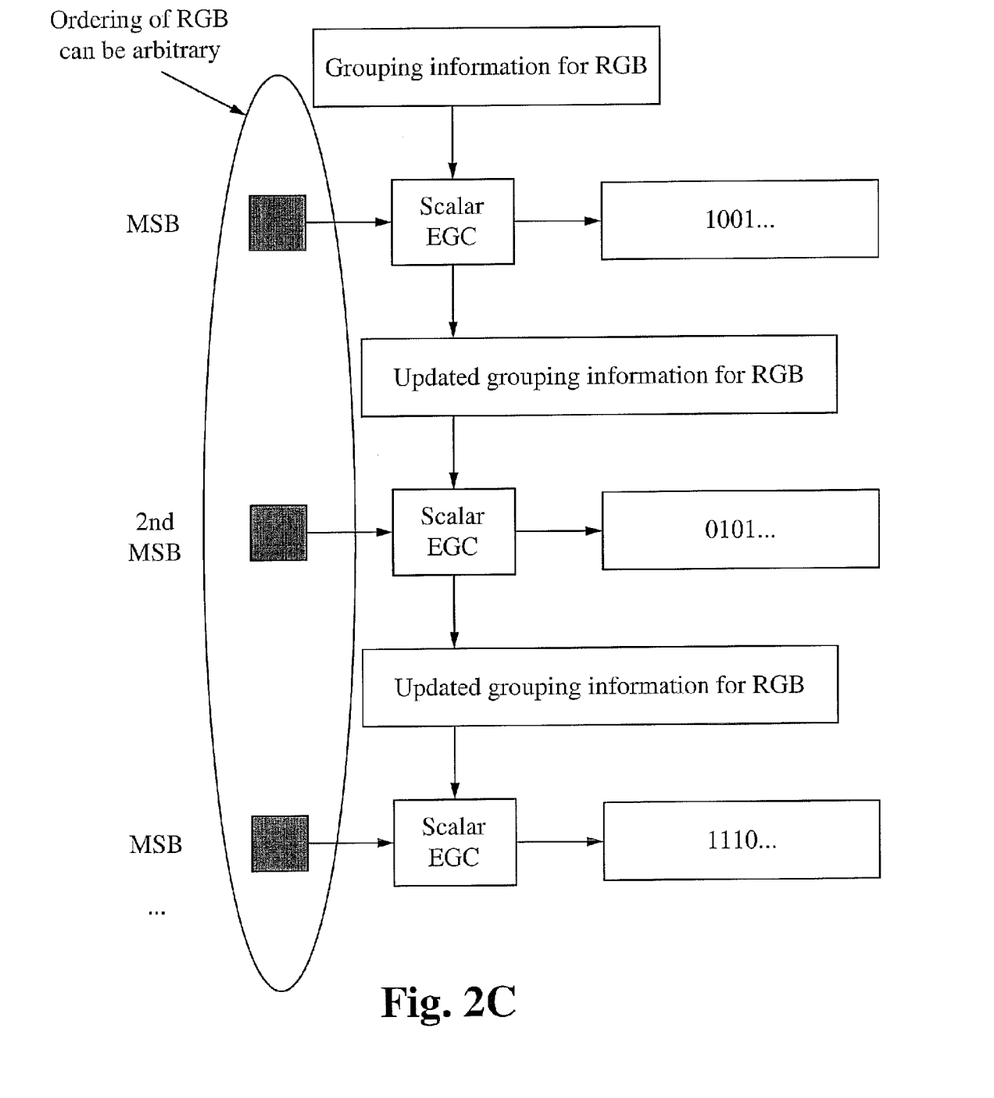
FIG. 2C illustrates a diagram of improved scalar EGC.

FIGS. 2A-C illustrate diagrams of scalar EGC (FIG. 2A), vector EGC (FIG. 2B) and improved scalar EGC (FIG. 2C). Scalar EGC is not as efficient as vector EGC because the grouping information is not shared. In the worst case, the same grouping information is coded three times in all RGB components. In vector EGC, three components are processed together to improve coding efficiency, which, however, also adds complexity. The improved scalar EGC has almost the same complexity as scalar EGC; however, the improved scalar EGC achieves similar results to vector EGC by using the shared grouping information. Furthermore, in the improved scalar EGC method, the processing order of RGB is able to be arbitrary, however within each color component, the bit planes are coded from MSB to LSB. An example of acceptable arbitrariness includes: encoding R1, R2, G1, B1, B2, B3, G2 . . . until the LSB. An example of an unacceptable arbitrary encoding includes: R1, B1 G2, G1, . . . , since G2 is not able to be encoded before G1. Additionally, the improved scalar EGC is able to be further improved, for example, by using "second-level grouping."

Second-Level Grouping

When encoding a bit-plane for a block, each group is processed, and for each group, a "0" is sent if a group is not split and a "1" is sent if a group is split. A group is viewed as split if the group contains both 0s and 1s. Contrastingly, a group is not split if the group contains only 0s or only 1s. The processing of the groups in this manner is referred to as transferring "splitting signaling." For graphics blocks, the "splitting signaling" is still redundant with many more 0's than 1's. To achieve further compression, a second level of grouping is able to be performed on the "splitting signaling." In vector EGC a "0" is sent if there is no splitting in either R, G or B for a group, which is essentially using "0" to replace "000" which saves two bits. In the improved scalar EGC, a "0" is sent if no group is split in the current bit plane (of the current color), which is essentially using a "0" to replace "00 . . . 0" where the savings depend on the number of groups in the color component. When there is a split in one of the groups, then a "1" is sent for the second level grouping, and the splitting signaling occurs as described.

Figure 3:
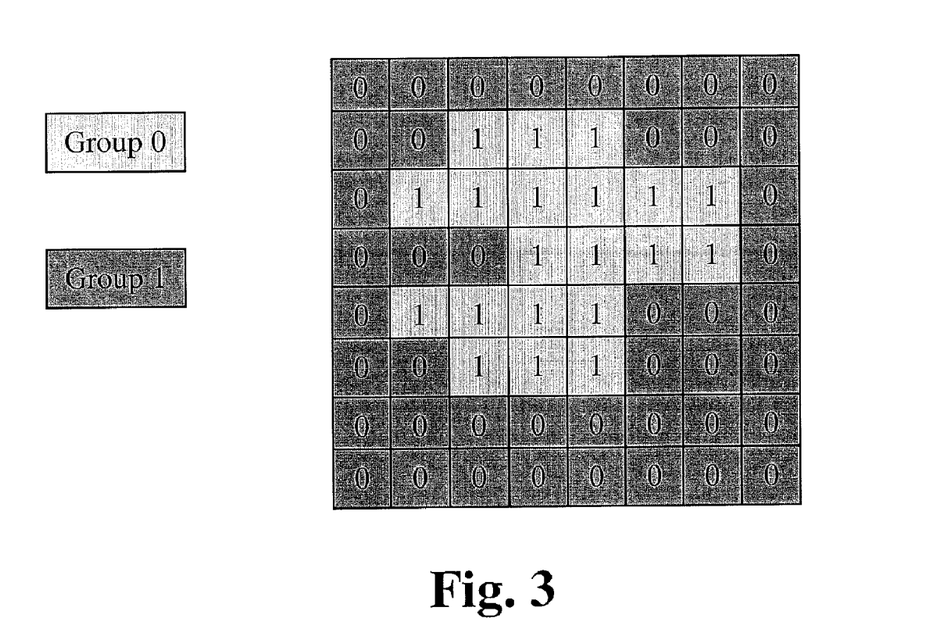
FIG. 3 illustrates an example of a current bit-plane with two groups where neither of the groups is split.

FIG. 3 illustrates an example of a current bit-plane with two groups where neither of the groups is split. A "0" is sent for the $2^{nd}$-level grouping to indicate that neither of the groups is split. Then, a "1" is sent to refine group 0, and a "0" is sent to refine group 1, since each of those groups contain that respective value.

Figure 4:
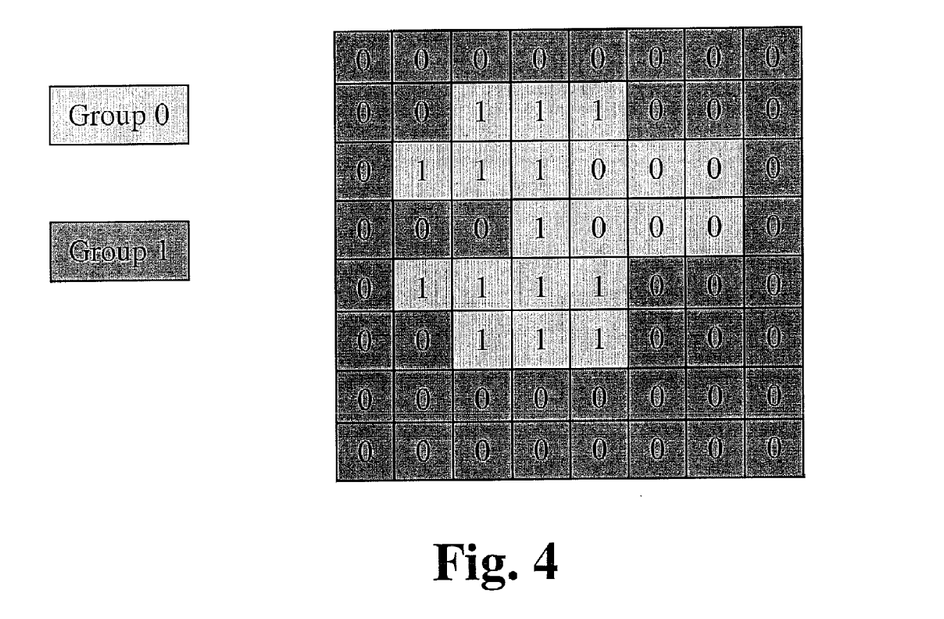
FIG. 4 illustrates an example of a current bit-plane with two groups where one of the groups is split, specifically group 0 is split.

FIG. 4 illustrates an example of a current bit-plane with two groups where one of the groups is split, specifically group 0 is split. The $2^{nd}$-level grouping is sent for the entire bit-plane, and a "1" denotes that at least one group is split. Group 0 is then encoded as usual, where a "1" is sent to indicate a split, and the refinement bits are sent (111111000100011111111). Group 1 is encoded as usual, with a "0" for non-split and a "0" for refinement.

Figure 5:
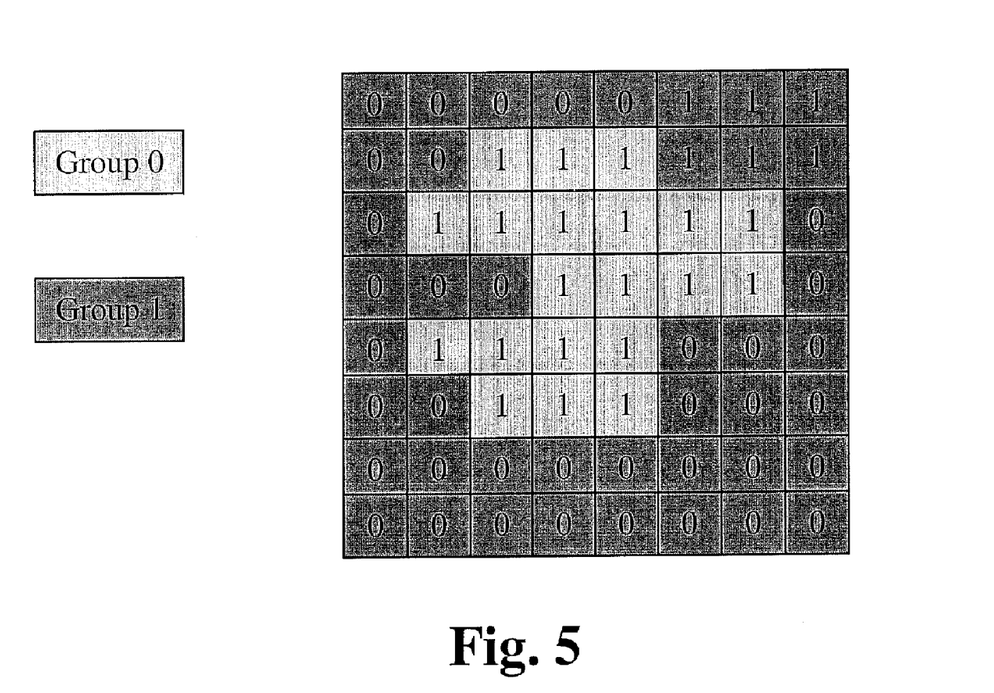
FIG. 5 illustrates an example of a current bit-plane with two groups where one of the groups is split, specifically group 1 is split.

FIG. 5 illustrates an example of a current bit-plane with two groups where one of the groups is split, specifically group 1 is split. The $2^{nd}$-level grouping is sent for the entire bit-plane, and a "1" denotes that at least one group is split. Group 0 is encoded as usual, with a "0" for non-split, and a "1" for refinement. Group 1 is encoded as usual, where a "1" is sent to indicate a split, and the refinement bits are sent (00000111 ... 0). In a special case, the "1" is not needed to indicate the split. Specifically, where all of the groups aside from the last one do not include a split (e.g. "0" encoding) and the last group is split (e.g. "1" encoding), then the "1" is not needed to indicate the $2^{nd}$ level split.

Figure 6:
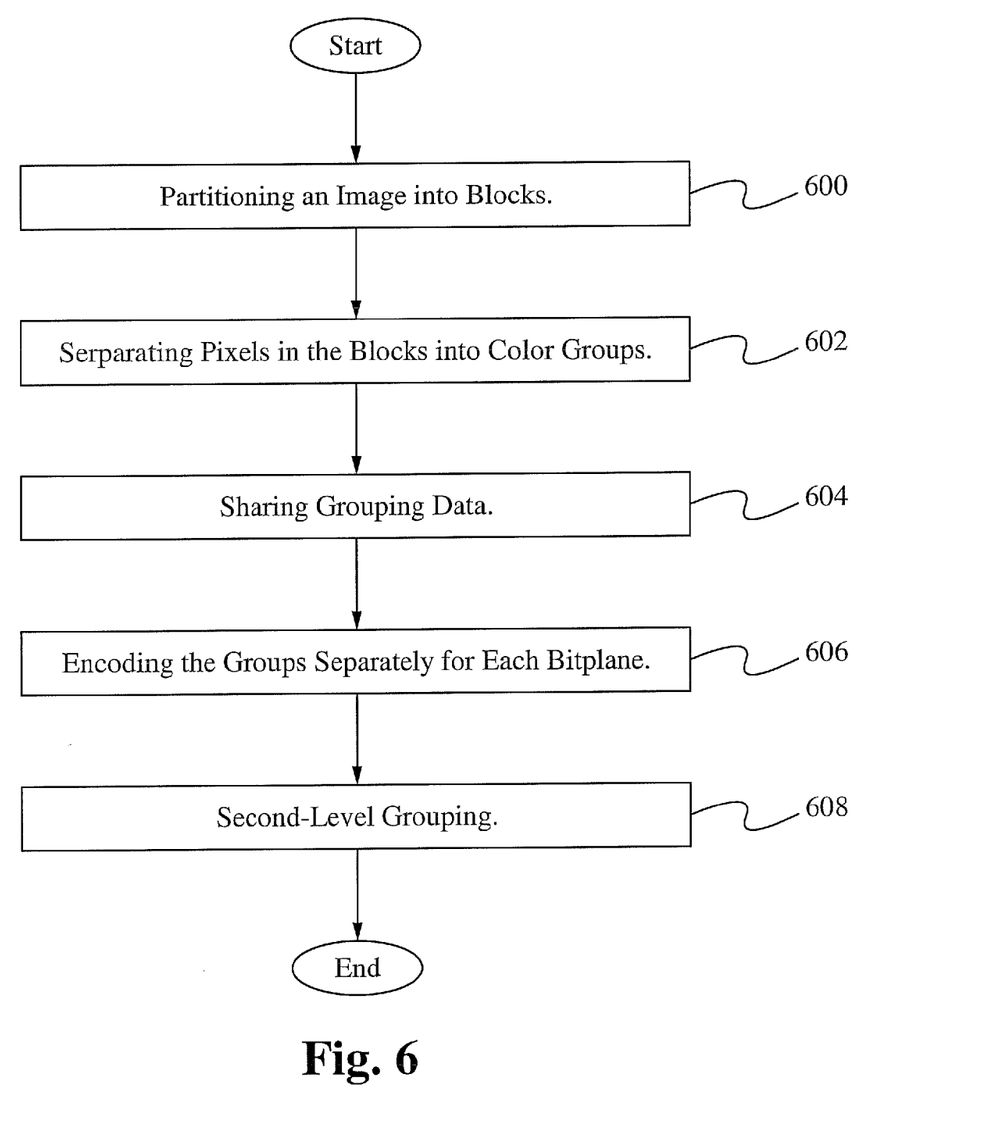
FIG. 6 illustrates a flowchart of a method of improved scalar EGC according to some embodiments.

FIG. 6 illustrates a flowchart of a method of improved scalar Embedded Graphics Coding (EGC) according to some embodiments. In the step 600, an input content such as a frame of a video is divided into blocks. In the step 602, pixels in the each of the blocks are separated into groups. In the step 604, grouping data is shared. The grouping data includes information indicating which group each pixel belongs to. In the step 606, each group is encoded separately for each bitplane. In the step 608, second-level grouping as described herein occurs. Specifically, in second-level grouping, a bit indicating whether any of the groups contain a split is first coded, and then the splitting signaling is performed. When the groups are not split, instead of sending redundant 0s to indicate that each group is not split, a single second level "0" is able to be sent to indicate that none of the groups are split, and then the refinement bits are sent. Since splits are less common than non-splits, the bit savings with second-level grouping are able to be significant. In some embodiments, the steps 606 and 608 are combined such that the second-level grouping occurs to determine if the splitting signaling bits are able to be reduced by grouping. Although specific steps are described, in some embodiments, fewer or more steps are included, and/or the order of the steps is able to be changed.

Figure 7:
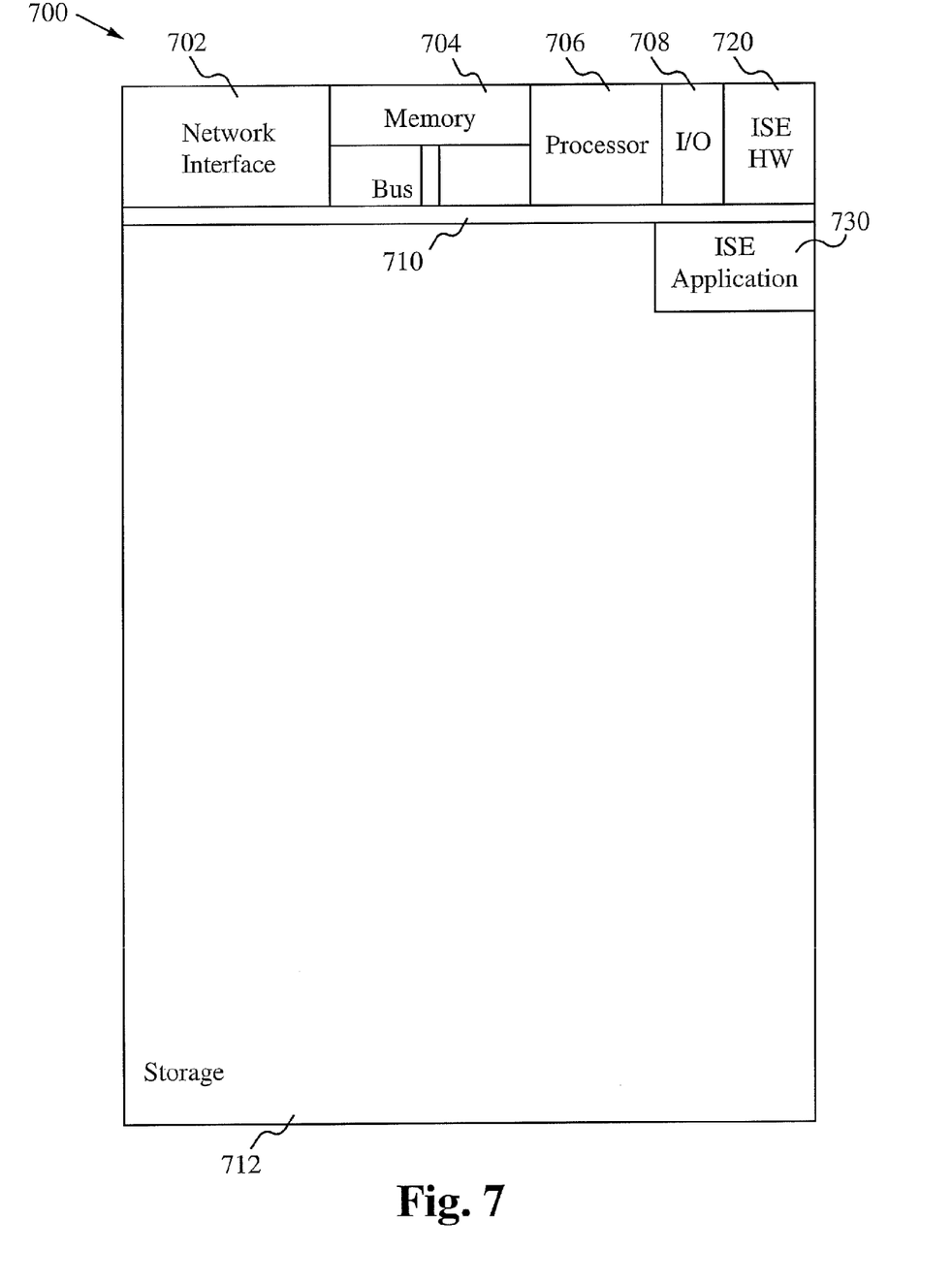
FIG. 7 illustrates a block diagram of an exemplary computing device configured to implement the improved scalar EGC method according to some embodiments.

FIG. 7 illustrates a block diagram of an exemplary computing device 700 configured to implement the improved scalar EGC method according to some embodiments. The computing device 700 is able to be used to acquire, store, compute, communicate and/or display information such as images and videos. For example, a computing device 700 is able to acquire and store a video. The improved scalar EGC method is able to be used during or after acquiring the video, or when transferring the video from the device 700 to another device. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Improved scalar EGC application(s) 730 used to perform the improved scalar EGC method are likely to be stored in the storage device 712 and memory 704 and processed as applications are typically processed. More or less components shown in FIG. 7 are able to be included in the computing device 700. In some embodiments, improved scalar EGC hardware 720 is included. Although the computing device 700 in FIG. 7 includes applications 730 and hardware 720 for compression, the improved scalar EGC method is able to be implemented on a computing device in hardware, firmware, software or any combination thereof. For example, in some embodiments, the compression applications 730 are programmed in a memory and executed using a processor. In another example, in some embodiments, the compression hardware 720 is programmed hardware logic including gates specifically designed to implement the compression method.

In some embodiments, the improved scalar EGC application(s) 730 include several applications and/or modules. As described herein, a partitioning module for partitioning an image into blocks, a separating module for separating the blocks into color groups, a sharing module for sharing grouping data, an encoding module for encoding each color of the block separately for each bitplane and a second-level grouping module for implementing second level grouping. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device.

To utilize the improved scalar EGC method, a user acquires a video/image such as on a digital camcorder, and while or after the video is acquired, or when sending the video to another device such as a computer, the improved scalar EGC method automatically compresses each image of the video, so that the video is compressed appropriately to maintain a high quality video. The improved scalar EGC method occurs automatically without user involvement.

In operation, the improved scalar EGC performs almost as efficiently as the vector EGC but with lower complexity and better compatibility with Wireless HD 1.1 syntaxes.

The improved scalar EGC method described herein is able to be used with videos and/or images.

High definition video is able to be in any format including but not limited to HDCAM, HDCAM-SR, DVCPRO HD, D5 HD, XDCAM HD, HDV and AVCHD.

Although, the improved scalar EGC method is described herein related to compression for Wireless HD, the improved scalar EGC method is not limited to this implementation and is able to be used for any compression.

Some Embodiments of Joint Scalar Embedded Graphics Coding for Color Images

1. A method of compression programmed in a controller in a device comprising:
   a. partitioning an image into blocks;
   b. separating the blocks into groups, wherein the groups are based on shared data of the groups among color components; and
   c. encoding the groups separately for each bit plane using splitting signaling 2. The method of clause 1 wherein splitting signaling further comprises:
   a. indicating whether a group of the groups is split;
   b. if the group is split, then coding raw bits of the group; and
   c. if the group is not split, then coding a refinement bit.

3. The method of clause 2 wherein the split comprises disparate bit values and the not split comprises same bit values.

4. The method of clause 1 wherein second-level grouping is applied to the splitting signaling of the groups.

5. The method of clause 4 wherein the second-level grouping includes:
   a. determining if any of the groups are split;
   b. if none of the groups are split, then indicating no split in the groups and coding a refinement bit for each of the groups; and
   c. if at least one of the groups is split:
      i. indicating a split in at least one of the groups;
      ii. indicating whether the individual group is split; and
      iii. if the individual group is split, then coding raw bits of the group, and if the group is not split, then coding a refinement bit.

6. The method of clause 1 wherein the shared data includes information about which of the groups pixels belong to.

7. The method of clause 1 wherein encoding each bit plane of each group is in an arbitrary order, wherein arbitrary includes any order of color components but going from a most significant bit plane to a least significant bit plane.

8. The method of clause 1 wherein the image is a frame from a high definition video.

9. The method of clause 8 wherein the high definition video is a format selected from the group consisting of HDCAM, HDCAM-SR, DVCPRO HD, D5 HD, XDCAM HD, HDV and AVCHD.

10. The method of clause 1 wherein the controller is selected from the group consisting of a programmed computer readable medium and an application-specific circuit.

11. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

12. A system for compression programmed in a controller in a device, the system comprising:
   a. a partitioning module for partitioning an image into blocks;
   b. a separating module for separating the blocks into groups, wherein the groups are based on shared data among color components; and
   c. an encoding module for encoding the groups separately for each bit plane using splitting signaling.

13. The system of clause 12 wherein splitting signaling further comprises:
   a. indicating whether a group of the groups is split;
   b. if the group is split, then coding raw bits of the group; and
   c. if the group is not split, then coding a refinement bit.

14. The system of clause 13 wherein the split comprises disparate bit values and the not split comprises same bit values.

15. The system of clause 12 further comprising a second-level module for applying second-level grouping to the splitting signaling of the groups.

16. The system of clause 15 wherein the second-level grouping includes:
   a. determining if any of the groups are split;
   b. if none of the groups are split, then indicating no split in the groups and coding a refinement bit for each of the groups; and
   c. if at least one of the groups is split:
      i. indicating a split in at least one of the groups;
      ii. indicating whether the individual group is split; and
      iii. if the individual group is split, then coding raw bits of the group, and if the group is not split, then coding a refinement bit.

17. The system of clause 12 wherein the shared data includes information about which of the groups pixels belong to.

18. The system of clause 12 wherein encoding each bit plane of each group is in an arbitrary order, wherein arbitrary includes any order of color components but going from a most significant bit plane to a least significant bit plane.

19. The system of clause 12 wherein the image is a frame from a high definition video.

20. The system of clause 19 wherein the high definition video is a format selected from the group consisting of HDCAM, HDCAM-SR, DVCPRO HD, D5 HD, XDCAM HD, HDV and AVCHD.

21. The system of clause 12 wherein the controller is selected from the group consisting of a programmed computer readable medium and an application-specific circuit.

22. The system of clause 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

23. A camera device comprising:
   a. a video acquisition component for acquiring a high definition video;
   b. a memory for storing an application, the application for:
      i. partitioning an image of the video into blocks;
      ii. separating the blocks into groups, wherein the groups are based on shared data of the groups among color components; and
      iii. encoding the groups separately for each bit plane using splitting signaling; and
   c. a processing component coupled to the memory, the processing component configured for processing the application.

24. The camera device of clause 23 wherein splitting signaling further comprises:
   a. indicating whether a group of the groups is split;
   b. if the group is split, then coding raw bits of the group; and
   c. if the group is not split, then coding a refinement bit.

25. The camera device of clause 24 wherein the split comprises disparate bit values and the not split comprises same bit values.

26. The camera device of clause 23 wherein second-level grouping is applied to the splitting signaling of the groups.

27. The camera device of clause 26 wherein the second-level grouping includes:
   a. determining if any of the groups are split;
   b. if none of the groups are split, then indicating no split in the groups and coding a refinement bit for each of the groups; and
   c. if at least one of the groups is split:
      i. indicating a split in at least one of the groups;
      ii. indicating whether the individual group is split; and
      iii. if the individual group is split, then coding raw bits of the group, and if the group is not split, then coding a refinement bit.

28. The camera device of clause 23 wherein the shared data includes information about which of the groups pixels belong to.

29. The camera device of clause 23 wherein encoding each bit plane of each group is in an arbitrary order, wherein arbitrary includes any order of color components but going from a most significant bit plane to a least significant bit plane.

30. The camera device of clause 23 wherein the image is a frame from a high definition video.

31. The camera device of clause 30 wherein the high definition video is a format selected from the group consisting of HDCAM, HDCAM-SR, DVCPRO HD, D5 HD, XDCAM HD, HDV and AVCHD.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of compression programmed in a controller in a device comprising:
   a. partitioning an image into blocks;
   b. separating the blocks into groups, wherein the groups are based on shared data of the groups among color components; and
   c. encoding the groups separately for each bit plane using splitting signaling.

2. The method of claim 1 wherein splitting signaling further comprises:
   a. indicating whether a group of the groups is split;
   b. if the group is split, then coding raw bits of the group; and
   c. if the group is not split, then coding a refinement bit.

3. The method of claim 2 wherein the split comprises disparate bit values and the not split comprises same bit values.

4. The method of claim 1 wherein second-level grouping is applied to the splitting signaling of the groups.

5. The method of claim 4 wherein the second-level grouping includes:
   a. determining if any of the groups are split;
   b. if none of the groups are split, then indicating no split in the groups and coding a refinement bit for each of the groups; and
   c. if at least one of the groups is split:
      i. indicating a split in at least one of the groups;
      ii. indicating whether the individual group is split; and
      iii. if the individual group is split, then coding raw bits of the group, and if the group is not split, then coding a refinement bit.

6. The method of claim 1 wherein the shared data includes information about which of the groups pixels belong to.

7. The method of claim 1 wherein encoding each bit plane of each group is in an arbitrary order, wherein arbitrary includes any order of color components but going from a most significant bit plane to a least significant bit plane.

8. The method of claim 1 wherein the image is a frame from a high definition video.

9. The method of claim 8 wherein the high definition video is a format selected from the group consisting of HDCAM, HDCAM-SR, DVCPRO HD, D5 HD, XDCAM HD, HDV and AVCHD.

10. The method of claim 1 wherein the controller is selected from the group consisting of a programmed computer readable medium and an application-specific circuit.

11. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

12. A non-transitory computer-readable medium in a device, the non-transitory computer-readable medium having a system for compression comprising:
   a. a partitioning module for partitioning an image into blocks;
   b. a separating module for separating the blocks into groups, wherein the groups are based on shared data among color components; and
   c. an encoding module for encoding the groups separately for each bit plane using splitting signaling.

13. The system of claim 12 wherein splitting signaling further comprises:
   a. indicating whether a group of the groups is split;
   b. if the group is split, then coding raw bits of the group; and
   c. if the group is not split, then coding a refinement bit.

14. The system of claim 13 wherein the split comprises disparate bit values and the not split comprises same bit values.

15. The system of claim 12 further comprising a second-level module for applying second-level grouping to the splitting signaling of the groups.

16. The system of claim 15 wherein the second-level grouping includes:
   a. determining if any of the groups are split;
   b. if none of the groups are split, then indicating no split in the groups and coding a refinement bit for each of the groups; and
   c. if at least one of the groups is split:
      i. indicating a split in at least one of the groups;
      ii. indicating whether the individual group is split; and
      iii. if the individual group is split, then coding raw bits of the group, and if the group is not split, then coding a refinement bit.

17. The system of claim 12 wherein the shared data includes information about which of the groups pixels belong to.

18. The system of claim 12 wherein encoding each bit plane of each group is in an arbitrary order, wherein arbitrary includes any order of color components but going from a most significant bit plane to a least significant bit plane.

19. The system of claim 12 wherein the image is a frame from a high definition video.

20. The system of claim 19 wherein the high definition video is a format selected from the group consisting of HDCAM, HDCAM-SR, DVCPRO HD, D5 HD, XDCAM HD, HDV and AVCHD.

21. The system of claim 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

22. A camera device comprising:
a. a video acquisition component for acquiring a high definition video;
b. a memory for storing an application, the application for:
  i. partitioning an image of the video into blocks;
  ii. separating the blocks into groups, wherein the groups are based on shared data of the groups among color components; and
  iii. encoding the groups separately for each bit plane using splitting signaling; and
c. a processing component coupled to the memory, the processing component configured for processing the application.

23. The camera device of claim 22 wherein splitting signaling further comprises:
a. indicating whether a group of the groups is split;
b. if the group is split, then coding raw bits of the group; and
c. if the group is not split, then coding a refinement bit.

24. The camera device of claim 23 wherein the split comprises disparate bit values and the not split comprises same bit values.

25. The camera device of claim 22 wherein second-level grouping is applied to the splitting signaling of the groups.

26. The camera device of claim 25 wherein the second-level grouping includes:
a. determining if any of the groups are split;
b. if none of the groups are split, then indicating no split in the groups and coding a refinement bit for each of the groups; and
c. if at least one of the groups is split:
  i. indicating a split in at least one of the groups;
  ii. indicating whether the individual group is split; and
  iii. if the individual group is split, then coding raw bits of the group, and if the group is not split, then coding a refinement bit.

27. The camera device of claim 22 wherein the shared data includes information about which of the groups pixels belong to.

28. The camera device of claim 22 wherein encoding each bit plane of each group is in an arbitrary order, wherein arbitrary includes any order of color components but going from a most significant bit plane to a least significant bit plane.

29. The camera device of claim 22 wherein the image is a frame from a high definition video.

30. The camera device of claim 29 wherein the high definition video is a format selected from the group consisting of HDCAM, HDCAM-SR, DVCPRO HD, D5 HD, XDCAM HD, HDV and AVCHD.

31. An application-specific circuit, the circuit comprising:
a. a partitioning element for partitioning an image into blocks;
b. a separating element for separating the blocks into groups, wherein the groups are based on shared data among color components; and
c. an encoding element for encoding the groups separately for each bit plane using splitting signaling.

* * * * *